United States Patent [19]

Lau et al.

[11] Patent Number: 5,840,221
[45] Date of Patent: Nov. 24, 1998

[54] PROCESS FOR MAKING SILICON CARBIDE REINFORCED SILICON CARBIDE COMPOSITE

[75] Inventors: Sai-Kwing Lau, Broadview Heights; Salavatore J. Calandra, Macedonia, both of Ohio; Roger W. Ohnsorg, Grand Island, N.Y.

[73] Assignee: Saint-Gobain/Norton Industrial Ceramics Corporation, Worcester, Mass.

[21] Appl. No.: 758,715

[22] Filed: Dec. 2, 1996

[51] Int. Cl.$^6$ ................................... C01B 31/36
[52] U.S. Cl. .................. 264/29.7; 264/29.1; 264/640; 264/642; 264/643
[58] Field of Search ................ 264/29.1, 29.7, 264/640, 642, 643, 649, 650

[56] References Cited

U.S. PATENT DOCUMENTS

| | | | |
|---|---|---|---|
| 4,642,271 | 2/1987 | Rice | 428/689 |
| 4,795,673 | 1/1989 | Frechettee et al. | 428/331 |
| 4,889,686 | 12/1989 | Singh et al. | 419/13 |
| 4,929,472 | 5/1990 | Sugihara et al. | 427/215 |
| 4,944,904 | 7/1990 | Singh et al. | 269/60 |
| 5,043,303 | 8/1991 | Singh et al. | 501/90 |
| 5,294,460 | 3/1994 | Tani et al. | 427/228 |
| 5,294,489 | 3/1994 | Luthra et al. | 428/379 |
| 5,296,311 | 3/1994 | McMurty et al. | 428/688 |
| 5,552,352 | 9/1996 | Brun et al. | 501/88 |
| 5,643,514 | 7/1997 | Chwastiak et al. | 264/640 |

*Primary Examiner*—Peter Chin
*Assistant Examiner*—Sean Vincent
*Attorney, Agent, or Firm*—Thomas M. DiMauro

[57] ABSTRACT

A process comprising the steps of:
a) providing a fiber preform comprising a non-oxide ceramic fiber with at least one coating, the coating comprising a coating element selected from the group consisting of carbon, nitrogen, aluminum and titanium, and the fiber having a degradation temperature of between 1400° C. and 1450° C.,
b) impregnating the preform with a slurry comprising silicon carbide particles and between 0.1 wt % and 3 wt % added carbon
c) providing a cover mix comprising:
   i) an alloy comprising a metallic infiltrant and the coating element, and
   ii) a resin,
d) placing the cover mix on at least a portion of the surface of the porous silicon carbide body,
e) heating the cover mix to a temperature between 1410° C. and 1450° C. to melt the alloy, and
f) infiltrating the fiber preform with the melted alloy for a time period of between 15 minutes and 240 minutes, to produce a ceramic fiber reinforced ceramic composite.

36 Claims, 6 Drawing Sheets

PROCESS FOR MAKING SILICON CARBIDE REINFORCED SILICON CARBIDE COMPOSITE

STATEMENT OF GOVERNMENT SUPPORT

A portion of the subject matter of this invention was developed under the High Speed Civil Transport/Enabling Propulsion Materials Program, sponsored by NASA through Contract No. NAS3-26385.

BACKGROUND OF THE INVENTION

Reinforced ceramic matrix composites ("CMC's") are well suited for structural applications because of their toughness, thermal resistance, high temperature strength and chemical stability. These composites can be produced by adding whiskers, fibers or platelets to a ceramic matrix. In the fabrication of continuous fiber reinforced-ceramic matrix composites ("CFCC's"), the fabrication process usually begins by weaving continuous fiber tows (e.g., sintered SiC fibers such as Hi-Nicalon™ or Dow Corning Sylramic™) into a cloth such as 2-dimension 5HS or 8HS, or 3-dimension cloths. The woven fiber cloth is then formed into a panel or shape called a fiber preform. The porosity within the fiber preform is then filled to produce the dense CFCC. The non-brittle nature of the CFCC provides the much needed reliability that is otherwise lacking in monolithic ceramics.

The enhanced fracture resistance of ceramic matrix composites is achieved through crack deflection, load transfer, and fiber pull-out. Fiber pullout is achieved by having little or no chemical bonding between the fibers and matrix, so that the fibers are able to slide along the matrix. However, it is also known that many fiber-matrix combinations undergo extensive chemical reaction or interdiffusion between the fiber and matrix materials during densification. Such reaction or interdiffusion can lead to serious degradation in strength, toughness, temperature stability and oxidation resistance. Accordingly, the proper fiber-matrix interface must be selected in order to prevent or minimize chemical reactions and interdiffusion.

Surface modification of the fibers is an effective means to control reaction at the fiber-matrix interface. This can be accomplished by coating the fibers with a suitable ceramic. Equally important, a suitable ceramic coating also allows the debonding of the fiber's matrix interface and enables the fiber to pull out from the matrix and slide along the matrix, thus increasing the fracture toughness of the composite. Coated silicon carbide fibers and whiskers are known in the art of composite materials. U.S. Pat. No. 4,929,472 ("Sugihara") discloses SiC whiskers having a surface coated with either a carbonaceous layer or a silicon nitride layer. These surface coated whiskers are used as a reinforcing material for ceramics such as SiC, TiC, $Si_3N_4$, or $Al_2O_3$. U.S. Pat. No. 4,781,993 to Bhatt discloses a SiC fiber reinforced reaction bonded $Si_3N_4$ matrix wherein the SiC fibers are coated with an amorphous carbon layer and an overlayer having a high silicon/carbon ratio covering the amorphous layer. U.S. Pat. No. 4,642,271 to Rice discloses BN coated ceramic fibers embedded in a ceramic matrix. The fibers may be SiC, $Al_2O_3$ or graphite, while the matrix may be $SiO_2$, SiC, $ZrO_2$, $ZrO_2$-$TiO_2$, cordierite, mullite, or coated carbon matrices. U.S. Pat. No. 4,944,904 to Singh et al. discloses a composite containing boron nitride coated fibrous material. Carbon or SiC fibers are coated with BN and a silicon-wettable material and then admixed with an infiltration-promoting material. This mixture is formed into a preform which is then infiltrated with a molten solution of boron and silicon to produce the composite.

The densification of green CFCC's is more difficult than that of green monolithic ceramics. Conventional sintering of a green ceramic matrix reinforced with sintered fibers is not possible, as the green ceramic matrix has rigid inclusions. Densification of green CFCC's can, however, be achieved by chemical vapor infiltration ("CVI") or molten silicon infiltration. Molten silicon infiltration is the preferred method because it is less time consuming and more often produces a fully dense body than the CVI process. For high temperature applications, full densification is necessary for good thermal and mechanical properties and for preventing rapid oxidation/degradation of the reinforcements or reinforcement coating. For example, desirable characteristics for CFCC's used in air transport applications include a high thermal conductivity, high tensile strength, high tensile strain and a high cyclic fatigue peak stress. One conventional CFCC fabricated by state-of-the-art chemical vapor infiltration processing has been found to have a thermal conductivity of only about 4.7 BTU/hr·ft·F. at 2200° F., and a cyclic fatigue peak stress of only about 15 ksi (about 105 MPa) using a Hi-Nicalon™ fiber. It is believed the low thermal conductivity and cyclic fatigue peak stress of this CVI material is due to the material's relatively high porosity (typically 10–20%) which is common for CVI processes. According, the art has focused upon densification by silicon infiltration.

Densification by silicon infiltration has been practiced for monolithic ceramics, such as reaction-bonded silicon carbide, for many years. This process, as described in U.S. Pat. No. 3,205,043 to Taylor, involves infiltrating molten silicon through the pores of a green body containing alpha silicon carbide and carbon. The silicon reacts with the carbon to form beta-SiC, which then bonds the alpha-SiC grains together. The portion of the infiltrated molten silicon which does not react with the carbon solidifies upon cooling, thereby filling the pores of the SiC bonded SiC body. This phenomenon is known as siliconization, and results in a fully dense end product containing SiC and residual free silicon. Since silicon infiltration does not involve shrinkage of the green body (as is the case with conventional sintering), the final dense product is near net shape. The art has used silicon infiltration to densify fiber-containing ceramic composites as well.

U.S. Pat. No. 5,296,311 ("McMurtry"), the specification of which is incorporated by reference, discloses a silicon infiltrated silicon carbide composite reinforced with coated silicon carbide fibers. McMurtry discloses a process including the steps of:

a) coating SiC fibers with a coating selected from the group consisting of aluminum nitride, boron nitride and titanium diboride;

b) treating the surface of the coated fibers with a mixture of SiC powder, water and a non-ionic surfactant;

c) preparing a slurry comprising SiC powder and water;

d) impregnating the coated fibers with the slurry using a vacuum dewatering process to form a cast;

e) drying the cast to form a green body; and f) silicon infiltrating the green body to form a dense SiC fiber reinforced reaction bonded matrix composite.

McMurtry reports that providing the disclosed coatings on SiC fibers limited both mechanical and chemical bonding with the matrix, and so improved the strength and toughness of the composite material. However, CFCC's produced in substantial accordance with McMurtry have been found to have a four point flexure strength at room temperature of only about 1 ksi. Since the tensile strength of a ceramic is typically only about 60%–90% of its four point flexure strength, these CFCC's likely have a tensile strength of only about 0.6–0.9 ksi. Further assuming an elastic modulus of about 30 million psi, these CFCC's likely have an ultimate tensile strain of less than 0.003% at room temperature. The reason for these low values is believed to be the low strength of the fiber used in McMurtry, as well as the partial reaction of the debonding coating with the molten silicon. Moreover, simple substitution of higher strength SiC fibers, such as Hi-Nicalon™ fiber, presents more severe degradation problems because the these higher strength fibers are considered to be more susceptible to degradation by molten silicon than the SiC fibers used by McMurtry. In particular, these higher strength fibers typically degrade in the temperature range of only about 1410°–1500° C. while the silicon infiltration step in McMurtry is undertaken at a temperature of about 1500° C.

In addition, one specific problem encountered with SiC reinforced SiC composites fabricated by a silicon infiltration process is that the SiC fiber or coating thereon may react with the molten silicon during infiltration, resulting in the degradation of the composite's desirable properties. For example, it has been found that, due to the high reactivity of molten silicon, the BN debonding coating is also attacked during the silicon infiltration step, resulting in severe degradation of the underlying SiC fiber and hence the CFCC properties. To reduce such attack, a duplex coating concept in which a second "protective" coating of CVD-SiC is deposited on top of the BN coating has been studied. See, e.g., U.S. Pat. No. 4,944,904. While the CVD-SiC coating is more stable than the underlying BN coating in the presence of molten silicon, it has been found that molten silicon still dissolves the CVD SiC coating considerably. As a result, the silicon melt infiltration process has to be conducted at a relatively low temperature (i.e., close to the melting point of silicon, which is 1410° C.) and for a short time (less than 30 minutes). Because of this abbreviated infiltration step, the resulting CFCC microstructures often have incomplete silicon infiltration, high porosity and poor thermo-mechanical properties.

A second aspect of the conventional process as typified by U.S. Pat. No. 4,889,686 which limits the completeness of silicon infiltration is the use of carbon in the impregnation slurry. During the slurry impregnation step, the coated fiber tows or fabrics are impregnated with carbon, which is typically present as at least 10 wt % of the slurry. The infiltrated fiber tows or fabrics are then placed in a vacuum furnace and heated in the presence of molten silicon. The infiltrated carbon quickly reacts with molten silicon to form a beta SiC matrix. According to McMurtry, the presence of carbon in the slurry provides a reactant for forming the matrix SiC, and is believed to improve the wetting behavior of molten silicon and so allows the silicon to penetrate deeper into the fiber tow interior. The beneficial effects of the impregnated carbon during silicon infiltration is widely accepted. For example, the General Electric Toughened Silcomp™ process uses a slurry with at least 10 wt % carbon. However, since the reaction between silicon and carbon is a highly exothermic one, the heat generated by this reaction can cause severe localized heating of the fiber preform to between 100 and 200 degrees C. above the intended molten silicon temperature. Since the stability of the higher strength SiC fibers and some debonding coatings (such as BN) are very sensitive to temperature, degradation of the coatings and the fibers are frequently encountered.

One approach for decreasing this degradation is to limit the time and temperature at which silicon infiltration is performed. As a result of the relatively low temperatures used in the silicon infiltration step, siliconization is often incomplete and unreacted carbon remains. Moreover, it has been observed in conventional processing that the silicon/carbon reaction near the surface regions of the green CFCC often blocks the subsequent flow of silicon into the green CFCC interior, causing localized porous areas; its volume change causes cracking in the near net-shape components; and unreacted free carbon in the composite degrades its high temperature oxidation resistance.

In a third aspect of the conventional process, silicon infiltration is carried out by placing several large chunks of solid silicon at various locations on top of the impregnated green material and heating the silicon to its melting point. In theory, the infiltration process relies primarily on the capillary action of the liquid silicon or the gaseous transport of silicon vapors to permeate the porous green CFCC preform and to react with the impregnated carbon in the preform to form in-situ SiC. Although this process works well for monolithic ceramics, wherein infiltration is usually conducted at relatively high temperatures (at least 1750° C.) which make the infiltration kinetics very fast, it does not work well with fiber preforms. Due to the limited thermal stability of the higher strength fibers and interface coating system, the temperature in CFCC's during molten silicon infiltration has to be kept very close to the melting point of silicon (about 1410° C). Since the infiltration kinetics are very slow at these lower temperatures, it takes an exceedingly long time for the molten silicon to wick or spread to areas not directly under a silicon chunk. This results in either nonuniform infiltration characterized by many porous areas or severe fiber/coating attack if the infiltration process is allowed to proceed for a much longer time to complete the infiltration. In either case, an inferior CFCC is produced. Secondly, with this technique it is also extremely difficult to control the net amount of silicon infiltrated into the fiber preform. As a result, extra silicon in the form of surface lumps is usually observed on the CFCC exterior. Although post-infiltration machining of these lumps can be undertaken, it not only increases the fabrication cost of the CFCC, it also degrades its CFCC properties.

Therefore, conventional CFCC's made by silicon infiltration processes typically contain fibers which are either heat resistant at typical silicon infiltration temperatures but have low strength, or contain fibers which have high strength but are susceptible to degradation at typical silicon infiltration temperatures. Conventional CFCC's made by CVI processes typically have high porosity, and so have low thermal conductivity, low cyclic fatigue peak stress at high temperatures, and low resistance to oxidation.

Accordingly, there is a need for a CFCC having a high thermal conductivity, a high cyclic fatigue peak stress at high temperatures, a high ultimate tensile strain, and a high ultimate tensile strength.

In a fourth aspect of the conventional process, it has been observed that the surface texture of the composite after silicon infiltration has the same highly rough woven structure of the fiber preform. For applications such as turbine or aerospace components that need an aerodynamic surface finish, such a rough surface can result in reduced performance. One proposed solution to the surface roughness problem is to deposit a layer of CVD SiC on the impregnated preform surface and then machine it to the desired surface finish. The disadvantage of this approach is that it is difficult and costly to machine the hard CVD SiC coating.

SUMMARY OF THE INVENTION

In accordance with the present invention, there is provided a preferred process comprising the steps of:
a) providing a fiber preform comprising a non-oxide ceramic fiber having at least one coating, the fiber and coating each optionally having a degradation temperature of between 1410° C. and 1450° C., the coating comprising an element selected from the group consisting of carbon, nitrogen, aluminum and titanium,
b) impregnating the preform in a porous mold with a slurry comprising silicon carbide particles and between 0.1 and 3 wt % added carbon to produce an impregnated green body,
c) providing a cover mix comprising:
   i) an alloy comprising a metallic infiltrant and the element, and
   ii) a resin,
d) placing the cover mix on at least a portion of the surface of the impregnated green body,
e) heating the cover mix to a temperature between 1400° C. and 1500° C. to melt the alloy (optionally, between 1410° C. and 1450° C.), and
f) infiltrating the green body with the melted alloy for a time period of between 15 minutes and 240 minutes, to produce a ceramic fiber reinforced ceramic composite.

Also in accordance with the present invention, there is provided a silicon carbide fiber reinforced silicon carbide composite having an ultimate tensile strain of at least 0.3% (preferably at least 0.6%) at 2200° F., an ultimate tensile strength of at least 20 ksi (preferably at least 30 ksi) at 2200° F., and having a thermal conductivity of at least about 5.5 BTU/hr·ft·°F. at 2200° F. and at least about 8 BTU/hr·ft·°F. at 22° C., a cyclic fatigue peak stress of at least 20 ksi at 2200° F. for 1000 hours, and less than 10 vol % in-situ formed beta silicon carbide.

DETAILED DESCRIPTION OF THE INVENTION

Figure 1:
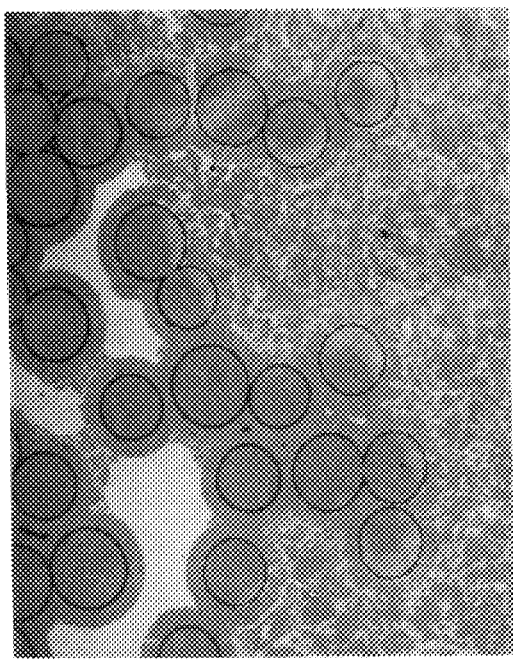
FIG. 1 is a photomicrograph at a 750× magnification of silicon carbide fiber reinforced silicon carbide composite conventionally infiltrated with molten unalloyed silicon.

For the purposes of the present invention, the "degradation temperature" of a fiber or coating is the temperature at which the fiber or inner coating begins to degrade after one hour exposure to molten silicon at that temperature, as observable under an optical microscope at 750×. An example of degraded fibers and degraded coatings is provided in FIG. 1. Similarly, "thermal conductivity" is measured by using a laser flash test to calculate the thermal diffusivity of the material. Similarly, "cyclic fatigue peak stress" is measured by heating the test bars used in ASTM C1275-94 to 2200° F. under no load, increasing the load to the test load within about 10–30 seconds, holding at the test load and 2200° F. for two hours, decreasing the test load to zero within about 10 seconds, and repeating this cycle for at least 1000 hours. The cyclic fatigue peak stress is the maximum test load which survives this cycling for at least 1000 hours. In addition, "impregnation" refers to the addition of silicon carbide particles to fill the porosity of the fiber preform, while "infiltration" refers to the addition of a molten metal such as silicon to the impregnated fiber preform.

In a first aspect, the fiber preform is soaked in a surfactant solution having no ceramic particles therein. In a second aspect of the present invention, the soaked preform is placed in a covered container having a liquid medium (preferably an aqueous SiC slurry), and a vacuum in drawn on the system, thereby eliminating trapped bubbles from the interior of the soaked preform. In a third aspect, the carbon source in the SiC impregnation slurry is limited to an amount of between about 0.1 wt % and 3 wt % added carbon (preferably between 0.1 and 1 wt % added carbon) of the slurry, thereby virtually eliminating the exothermic reaction of impregnated carbon with silicon and allowing a longer silicon infiltration step, which leads to more complete silicon infiltration. In a fourth aspect, the impregnation slurry further comprises a bimodal blend of silicon carbide, a small amount of boron carbide, and no binder. In a fifth aspect, the fiber preform is impregnated with the slurry by pressure casting in a porous mold, thereby promoting more complete impregnation of the preform. In a sixth aspect, the silicon carbide slurry impregnation process is allowed to proceed past the point of complete impregnation of the fiber preform so that green silicon carbide completely covers, or "overgrows", the surface of the preform, thereby allowing subsequent finishing to provide a low surface roughness. In a seventh aspect of the present invention, the silicon used to infiltrate the impregnated fiber preform is saturated with carbon, thereby reducing the driving force for the dissolution of the CVD SiC coating in the molten silicon and allowing a longer infiltration time and leading to more complete densification. In an eighth aspect, the silicon to be used in the silicon infiltration step is processed into a cover mix comprising silicon and a resin, and this mix is spread across a face of the CFCC fiber preform, thereby providing a more even distribution of the silicon during infiltration. In a ninth aspect, use of a high strength, but low degradation temperature fiber in conjunction with the above modifications allows the silicon infiltration step to be performed at temperatures (i.e., between about 1410° C. and 1450° C.) and times (i.e., between about 15 and 240 minutes) which do not degrade the high strength fiber but still allow for complete infiltration. In a tenth aspect, there is provided a non-oxide ceramic fiber reinforced ceramic composite which has high thermal conductivity, high cyclic fatigue peak stress, high ultimate tensile strength, and high ultimate tensile strain.

In the first aspect, prior to slurry impregnation, the fiber preform is soaked in a surfactant solution having no ceramic particles therein. Whereas the soak solution in the McMurtry process contained SiC particles, the soak solution of the present process preferably has no such particles. Without wishing to be tied to a theory, it is believed the McMurtry impregnation process (which provided vacuum dewatering through a filter-paper lined glass funnel) was prone to providing incomplete impregnation, and so SiC particles were added to the soak solution as a way of insuring the fibers were at least partially coated with SiC particles. It has been found the present process (which includes pressure impregnation through a porous mold) provides better impregnation of the slurry into the fiber preform than the McMurtry process, thereby eliminating the need for including SiC particles in the soak solution. Typically, the surfactant solution used to soak the fiber preform comprises deionized water and no more than about 2 wt % of a non-ionic wetting agent, such as 2 wt % Triton X-100 surfactant, comprising iso-octylphenoxypolyethoxyethanol.

In a second aspect of the present invention, the soaked preform is placed in a covered container having a liquid medium (preferably an aqueous SiC slurry), and a vacuum in drawn on the system, thereby eliminating trapped bubbles from the interior of the soaked preform.

In the third aspect, the amount of the added carbon in the impregnation slurry is limited to amounts below conventional levels. It has been unexpectedly found that SiC fiber preforms having a BN/SiC duplex overcoat can be completely infiltrated with silicon despite using lower than conventional amounts of carbon in the impregnation slurry. This finding is surprising because it was not previously known in the art how a low-carbon slurry (i.e., a slurry having between 0.1 wt % and 3 wt % added carbon) could be successfully used in a silicon infiltration process conducted at relatively low temperatures (i.e, between about 1410° C. and 1450° C.). Although Example I of McMurtry discloses a slurry having no added carbon, the silicon infiltration temperature of that Example was 1500° C. Without wishing to be tied to a theory, it is believed that the SiC fiber network in the green body acts as a transmission conduit for the molten alloy in the absence of carbon, and so the lower carbon level does not adversely affect the wetting behavior of silicon. Moreover, reduced carbon levels in the impregnation slurry also reduces the extent of the exothermic reaction in the subsequent silicon infiltration step between the infiltrating molten silicon and carbon to form in-situ beta silicon carbide.

This condition allows a larger temperature processing window, as it is no longer necessary to make allowance for the anticipated 100° C. to 200° C. temperature overshoot arising from the carbon-silicon reaction that may degrade the coating and fiber. This allows the use of high strength Hi-Nicalon™ fibers which are susceptible to degradation during the silicon infiltration conditions which were typically required for complete infiltration of the preform.

By reducing the carbon content of the slurry, many of the problems associated with traditional melt infiltration processes are eliminated, and a better composite with a fully dense and uniform matrix, little porosity, no unreacted residual free carbon, no matrix cracking, improved dimensional control, and no coating/fiber degradation is produced.

The added carbon in the slurry is typically present as particulate carbon, colloidal carbon, or carbon-yielding resins. The added carbon is calculated on the basis of the carbon char remaining after pyrolysis of the added carbon source.

In preferred embodiments of the present invention, the infiltration slurry comprises between about 0.1 wt % and 3 wt %, more preferably between 0.1 wt % and 1 wt % added carbon.

Therefore, in preferred embodiments, there is provided a process comprising the sequential steps of:
 a) providing a fiber preform comprising silicon carbide,
 b) impregnating the preform with a slurry comprising between 0.1 wt % and 3 wt % added carbon, and
 c) infiltrating the preform with a matrix alloy comprising silicon.

When this process is followed, the resulting CFCC typically has less than 10 vol % (preferably less than 3 vol %) insitu formed beta silicon carbide.

In the fourth aspect, the SiC impregnation slurry also comprises a bimodal blend of alpha silicon carbide, a small amount of boron carbide, and no binder component. The silicon carbide component of the slurry typically comprises a fine component having a particle size of between about 0.1 and 0.8 $\mu$m, and a coarse component having a particle size of between about 1 and 15 $\mu$m. Preferably, the fine component comprises between 25 wt % and 55 wt % of the slurry, while the coarse component comprises between 1 wt % and 30 wt % of the slurry. The bimodal nature of the silicon carbide provides higher packing in the porous preform and therefore provides lower porosity in both the green body and the densified CFCC. It has been found that using a fine unimodal mix of SiC particles produces poor packing, excessive shrinkage, and excessive drying, while a coarse unimodal SiC particle mix can not fully penetrate the fiber bundles. Boron carbide is typically present in an amount of between 0.5 wt % and 5 wt % of the slurry. The boron carbide component provides the advantage of improving the composite's oxidation resistance. It is believed that, when a crack occurs, the boron oxidizes and heals the crack. It was also unexpectedly found that removing the binder component from the slurry (which is disclosed in McMurtry as sodium silicate) did not decrease the strength of the green body or the densified CFCC. Typically green bodies require a binder in order to have acceptable green strength. Accordingly, in preferred embodiments, there is no binder component in the slurry. The slurry may also include conventional amounts of defoamers and dispersants In preferred embodiments, the slurry may comprise between 25 and 55 wt % fine silicon carbide, between 1 and 30 wt % coarse silicon carbide, between 0.5 and 5 wt % boron carbide, between 20 and 65 wt % deionized water, between 0 and 1 wt % deflocculant, between 0 and 0.2 wt % defoamer, between 0 and 0.5 wt % surfactant, and between 0 and 5 wt % carbon source. Preferably, the slurry may have a solids content of between 46 and 75 wt % and a pH of between 7 and 10.5.

In some embodiments, typical formulations of the slurry can include the following components:

|  | Slurry 1 | Slurry 2 | Slurry 3 | Slurry 4 | Slurry 5 |
| --- | --- | --- | --- | --- | --- |
| Total SiC | 84.75 | 83.49 | 84.24 | 54.51 | 75.23 |
| fine SiC | 56.44 | 50.09 | 46.33 | 35.43 | 48.90 |
| coarse SiC | 28.31 | 33.40 | 37.91 | 19.08 | 26.33 |
| $B_4C$ | 0.59 | 0.58 | 1.26 | 0.34 | 0.47 |
| DI water | 55.1 | 37.2 | 40.1 | 43.3 | 59.8 |
| % solids | 62 | 70 | 69 | 60 | 57.5 |
| defloc't | 0.3 | 0.4 | 0.3 | 0.2 | <1% |
| defoamer | 0.07 | 0.05 | 0.1 | 0.027 | <1% |
| surfac't | 0.76 | 0.73 | 0.73 | 0.073 | 0.1 |
| added carbon | 4.07 | 3.99 | 4.04 | 1.52 | 0.8 |

In more preferred embodiments, the deflocculant is a copolymer such as SMA 1440H (50% solution) available from ATOCHEM, North America in Philadelphia, Pa.; the defoamer is DB-31 emulsion, available from Ashland Chemical Co. of Tonawanda, N.Y.; the pH is adjusted with NaOH; the surfactant is a alkyl polyether alcohol such as Triton X-100, available from JT Baker of Phillipsburg, N.J.; and the added carbon is Derusol carbon black dispersion (56 % solids), available from Degussa of Frankfurt, Germany.

In the fifth embodiment, the fiber preform is infiltrated by pressure casting in a porous mold, thereby promoting more complete impregnation of the preform. In preferred embodiments, both the fiber preform and the mold duplicate the geometry and size of the final CFCC component. Typically, the mold is a porous plaster mold, and the cast pressure is between about 20 kPa and 200 kPa. Use of the porous mold in conjunction with the pressure casting has been found to produce a CFCC having a higher degree of impregnation than the process disclosed in McMurtry, which included casting under atmospheric pressure through a glass funnel lined with filter paper. In addition, whereas the funnel used in the McMurtry process could provide only a one-way draw, the porous mold of the present invention can provide a draw which is uniform throughout the surface of the preform. The ability to provide a uniform draw throughout the surface of the preform allows the impregnation of complex shapes. This ability was not present in the McMurtry process.

Therefore in accordance with the present invention, there is provided a pressure casting process for producing an impregnated fiber preform, comprising the steps of:

a) providing a fiber preform comprising:
  i) between 20 vol % and 80 vol % coated fiber, the fiber comprising silicon carbide,
  ii) between 20 vol % and 80 vol % porosity,
b) providing a porous mold having a well,
c) placing the fiber preform in the well,
d) contacting the fiber preform with a slurry comprising water and ceramic particles to impregnate the porosity of the fiber preform with the ceramic particles of the slurry, and
e) dewatering the slurry through the porous mold under pressure, to form a green body having a porosity which is lower than that of the fiber preform.

Preferably, the pressure used during impregnation is between about 20 kPa and about 200 kPa. The mold is preferably plaster of paris. The porosity of the complex shaped-green body produced by this process is typically between 15 vol % and 30 vol %.

In a sixth embodiment, the silicon carbide impregnation process is allowed to proceed past the point of complete impregnation of the fiber preform so that silicon carbide particles completely cover the surface of the preform, thereby allowing subsequent finishing to provide a low surface roughness. After demolding and drying the cast, this "overgrown" monolithic SiC layer is retained to provide a much finer surface finish. Furthermore, since the green overgrown surface monolithic SiC layer is much softer than the final densified surface but also has good green strength, additional surface finishing steps such as green machining can be easily conducted to give a highly finished surface comparable to that of the normal monolithic SiC components. This overgrown green body is then melt infiltrated with the alloy to fill the remaining porous interstices between the SiC particles and to react with the impregnated added carbon to form in-situ SiC both within the fiber preform and on the monolithic SiC surface layer. The final CFCC will then be converted to a fully dense composite with a smooth and tailored surface finish that is difficult or expensive to achieve using other CFCC processes such as CVI.

The overgrowth process can be conducted on any CFCC shapes including flat panels and cylinders. In one preferred embodiment, cylindrical fiber preforms are impregnated with a small gap (less than 0.5 cm) between the outer diameter of the cylinder and the mold surface, thereby allowing a monolithic layer to be built up on the outer diameter. Impregnation is continued until an overgrowth layer is also built up on the inner diameter. After demolding and drying, the inner diameter is scraped to provide a rough surface while the outer diameter is polished to provide a smooth surface finish. After melt infiltration, a component with tailored surface finish (smooth outer diameter and rough inner diameter) is readily obtained.

Using the overgrowth process, CFCC's having high surface smoothness exteriors can be obtained economically. This will allow the use of toughened ceramic composites in many applications where aerodynamic requirements are also important. In addition, this invention can also provide tailored surface finishes for CFCC's used as combustor liners for aircraft or gas turbine applications where both heat and gas flows are key parameters for optimum performance. With this invention, the two surfaces can be tailored to have a rough surface away from gas flow (for optimum heat dissipation), and a smoother surface near the gas flow (to optimize gas flow aerodynamics).

Therefore, in accordance with the present invention, there is provided a process for providing a smooth surface on a CFCC, comprising the steps of:

a) providing a fiber preform comprising:
  i) between 20 vol % and 80 vol % coated fiber, the fiber comprising silicon carbide, and
  ii) between 20 and 80 vol % porosity,
b) impregnating a slurry comprising ceramic particles into the porosity of the fiber preform to form a green body having a lower porosity than the fiber preform (preferably, between 15 vol % and 30 vol % porosity) and an exterior surface, and
c) depositing ceramic particles on the exterior surface of the green body to form a monolithic layer of ceramic particles on the exterior surface of the green body, and, optionally,
d) machining the monolithic layer to a surface roughness Ra of no more than 200 microinches (5 $\mu$m).

In some embodiments, the monolithic layer comprises silicon carbide particulate and has a porosity of between 30 vol % and 60 vol %.

In some embodiments, the process further comprises the step of:

e) infiltrating the green body with a matrix alloy comprising molten silicon, and
f) finishing the melt-infiltrated composite to a surface roughness Ra of no more than 50$\mu$ inches.

In the seventh aspect of the present invention, carbon is dissolved in the alloy to be used in the melt infiltration step (preferably to or beyond the point of saturation), thereby reducing the driving force for the dissolution of the CVD SiC outer protective coating on the SiC fiber by the molten alloy and allowing more complete alloy infiltration. With a reduced risk of molten alloy attack upon the CVD silicon carbide outer protective coating, the alloy infiltration step can be designed for more complete densification. Typically, the alloy comprises at least 80 wt % silicon.

Without wishing to be tied to a theory, it is believed the SiC-molten silicon interaction occurs via a three-step mechanism. First, fine Sic grains from the CVD outer protective coating dissolve in the molten silicon as silicon and carbon. After dissolution, the carbon concentration in the molten silicon immediately adjacent the dissolved Sic coating becomes higher than that of more distant molten regions, thereby producing a carbon concentration gradient in the molten silicon. With this concentration gradient acting as a driving force, the carbon in the carbon-rich region is transported down the concentration gradient to the carbon-poor region. When the moving carbon solute encounters a large SiC particle in its path, it uses the SiC particle as a nucleation site and reprecipitates out from the solution and produces larger SiC grains via recrystallization. The net result of the molten silicon attack is the dissolution of the fine Sic grains from the coating and the growth of the larger Sic grains elsewhere, so that the Sic coating is continuously dissolved by the molten silicon even though the solubility of Sic in silicon is limited. Since the key factor controlling the dissolution of the Sic coating appears to be the carbon concentration gradient, providing a prealloyed silicon having dissolved carbon therein can reduce or eliminate the formation of the carbon concentration gradient in the molten silicon, and the transport process responsible for allowing continued removal of the dissolved carbon will not occur. Since silicon carbide fibers are often fine-grained and so are susceptible to the same degradation mechanism discussed above, the silicon-carbon alloy should also hinder dissolution of fine-grained Sic fibers as well. With these problems minimized or eliminated, the melt infiltration process can proceed more completely. Moreover, providing a carbon solute in the molten silicon also has the effect of lowering the melting point of the silicon, thus allowing lower temperatures to be used and reducing the risk of degrading the SiC fibers. Accordingly, using a silicon-carbon alloy has the dual benefit of hindering SiC coating dissolution (and by the same mechanism, fine-grained SiC fiber dissolution) and lowering the required processing temperature.

One embodiment of the alloy of the present invention can be made by adding between about 0.003 wt % and 10 wt % carbon to molten silicon. It is typically made by simply mixing silicon and carbon powders and melting them at a temperature higher than the melt infiltration temperature. The alloy is then typically cooled to a solid, and the solid is crushed into usable size particles.

It is also believed that dissolving nitrogen into molten silicon can be effective in reducing silicon attack on coatings comprising nitrogen, such as boron nitride coatings. Therefore, in accordance with the present invention, there is provided a process comprising the steps of:
 a) providing a fiber preform comprising a non-oxide ceramic fiber having at least one coating, the coating comprising an element selected from the group consisting of carbon, nitrogen, aluminum and titanium,
 b) heating a matrix alloy comprising a metallic infiltrant (preferably silicon) and a predetermined amount of the element dissolved therein, and
 c) infiltrating the fiber preform with the matrix alloy.

Also in accordance with the present invention, there is provided a composite comprising:
 a) a fiber preform comprising a non-oxide ceramic fiber having at least one coating, the coating comprising an element selected from the group consisting of carbon, nitrogen, aluminum and titanium, and
 b) a matrix alloy, wherein the matrix alloy comprises the element dissolved therein.

In preferred embodiments of this composite, the non-oxide fiber is coated by an inner debonding coating of boron nitride and an outer protective coating of CVD silicon carbide, and the matrix alloy comprises boron and carbon dissolved therein.

Typically, the metallic infiltrant of the matrix alloy is silicon. However, other metallic infiltrants which melt at temperatures lower than the degradation temperature of the non-oxide fiber selected for the fiber preform and which are resistant to oxidation can be used. For example, suitable metallic infiltrants include silicon, aluminum and any other metal having a melting point lower than the degradation temperature of the fiber, and mixtures thereof. When silicon is selected as the metallic infiltrant, it generally comprises at least 80 wt %, more preferably at least 95 wt %, of the matrix alloy. In some preferred embodiments suitable for use with duplex coatings of an inner debonding coating of boron nitride and an outer protective coating of silicon carbide, the alloy comprises: a) between 80 wt % and 99.997 wt % silicon, b) between 0.003 wt % and 10 wt % carbon, and c) between 1 wt % and 10 wt % boron.

In embodiments wherein at least one coating comprises carbon, such as silicon carbide, the alloy comprises at least 90 wt % silicon and at least about 0.003 wt % dissolved carbon as the element. In embodiments wherein at least one coating comprises nitrogen, such as boron nitride or aluminum nitride, the alloy can comprise at least 1 wt % nitrogen as the element. In some embodiments wherein at least one coating comprises aluminum, such as aluminum nitride, the alloy comprises at least 1 wt % dissolved aluminum. In some embodiments wherein at least one coating comprises titanium, such as titanium diboride, the alloy comprises at least 1 wt % dissolved titanium. In practice only very small amounts of the element need be added to the alloy so that the element saturates the alloy. In some embodiments, the carbon is present in an amount corresponding to at least 50 % of its saturation level in the alloy when the alloy is heated to 1410° C.

In the eighth embodiment, and in order to facilitate the infiltration of the alloy, there is provided a cover mix comprising silicon and a resin. The cover mix is placed on at least one face of the green CFCC preform prior to the infiltration step for more even distribution of the silicon during infiltration. In one embodiment of the cover mix suitable for use with simple CFCC preform shapes (such as a flat panel), an amount of the cover mix containing substantially the same amount of silicon needed to fully densify the preform is made into a flat bed having the same length and width as the preform. The fiber preform is then placed directly on top of the cover mix bed and the combination is placed in the furnace. Since every portion of one surface of the fiber preform is in direct contact with the cover mix, the maximum distance needed to be traversed by the silicon in order to fully infiltrate the green CFCC is greatly decreased (usually to no more than 0.3 cm), and full and uniform melt infiltration is obtained. When melt infiltration is completed, the remnant of the cover mix is a porous SiC sponge that separates easily from the densified CFCC part.

Also, because both the area to be infiltrated and the total amount of silicon provided can be precisely controlled, there is very little excess silicon, as-processed surfaces appear very clean, and no additional machining is needed.

Another embodiment of the cover mix is more suitable for use with complex-shaped preforms. This cover mix comprising silicon and resin is first formed into a green thin shape duplicating the surface contour of the preform (typically, by a traditional ceramic powder forming technique such as pressing with a properly designed fixture). The mix is then placed in an oven to cure the resin, thereby forming a free standing cover blanket having the same contour of at least one face of the complex shaped preform and with the desired amount of silicon required for infiltration. The cured cover blanket (as a monolith or in segments) is then fitted on top of the fiber preform to provide an intimate contacting and uniform silicon infiltration source.

Therefore, in accordance with the present invention, there is provided a process for uniformly infiltrating a porous body with an infiltrant, the porous body having a surface, comprising the steps of:

a) providing a cover mix comprising an infiltrant material and a resin, the mix having a form adapted to intimately contact at least a portion of the porous body, b) placing the cover mix on at least a major portion of the portion of the surface of the porous body to be infiltrated, c) heating the cover mix to a temperature sufficient to melt the infiltrant material and infiltrate the pores of the porous body with the molten infiltrant.

In preferred embodiments, the cover mix comprises between 80 w/o and 98 w/o alloy and between 2 wt % and 15 wt % resin, and more preferably further comprises between 1 wt % and 5 wt % added carbon. In preferred embodiments used with fiber preforms, the matrix alloy comprises silicon presaturated with at least one element of the fiber coatings, as described above. When silicon is selected as the metallic infiltrant component of the alloy, at least 50 wt % of the silicon is typically present in grain sizes of no more than 4 mm. In some embodiments, the resin comprises a liquid phenolic resin.

In especially preferred embodiments, there is provided a process for siliconizing a porous silicon carbide body having a surface, comprising the steps of:

a) providing a cover mix comprising silicon and a resin, b) placing the cover mix on at least a portion of the surface of the porous silicon carbide body, and c) heating the cover mix to a temperature sufficient to melt the silicon and infiltrate the pores of the porous silicon carbide body with the melted silicon.

In other preferred embodiments, the infiltrant material comprises silicon and the amount of silicon in the cover mix constitutes a volume which is between 100 % and 200 % of the volume of porosity of the porous body. In others, the surface of the porous body has a contour and the cover mix is shaped to correspond to the contour of the surface of the porous body. In others, the cover mix is placed on the face of the porous body in a way such that the longest distance between any portion of the porous body and the cover mix is no more than 1 cm. In others, the face of the porous body has a curved contour, the resin of the cover mix is cured, and a portion of the cover mix has a shape substantially similar to the contour of the face of the porous body.

In the ninth embodiment, use of at least some of the above modifications allows the silicon infiltration step to be performed at a relatively low temperature (i.e., between about 1410° and 1450° C.) for a short time period (i.e., about 20 to 60 minutes) which prevents degradation of the fiber but still allows for complete infiltration.

Therefore, in accordance with the present invention, there is provided a process comprising the steps of:

a) providing a fiber preform comprising a non-oxide ceramic fiber having at least one coating, the coating comprising a coating element selected from the group consisting of carbon, nitrogen, aluminum and titanium, at least of the fiber and the coating having a degradation temperature of between 1410° C. and 1450° C., b) impregnating the preform with a slurry comprising silicon carbide particles and between 0.1 and 3 w/o added carbon, c) providing a cover mix comprising:
  i) an alloy comprising a metallic infiltrant and the coating element, and
  ii) a resin, d) placing the cover mix on at least a portion of the surface of the porous silicon carbide body, e) heating the cover mix to a temperature between 1410° C. and 1500° C. (preferably between 1410° C. and 1450° C.) to melt the alloy, and f) infiltrating the fiber preform with the matrix alloy for a time period of between 15 minutes and 240 minutes, to produce a ceramic fiber reinforced ceramic composite.

Figure 5:
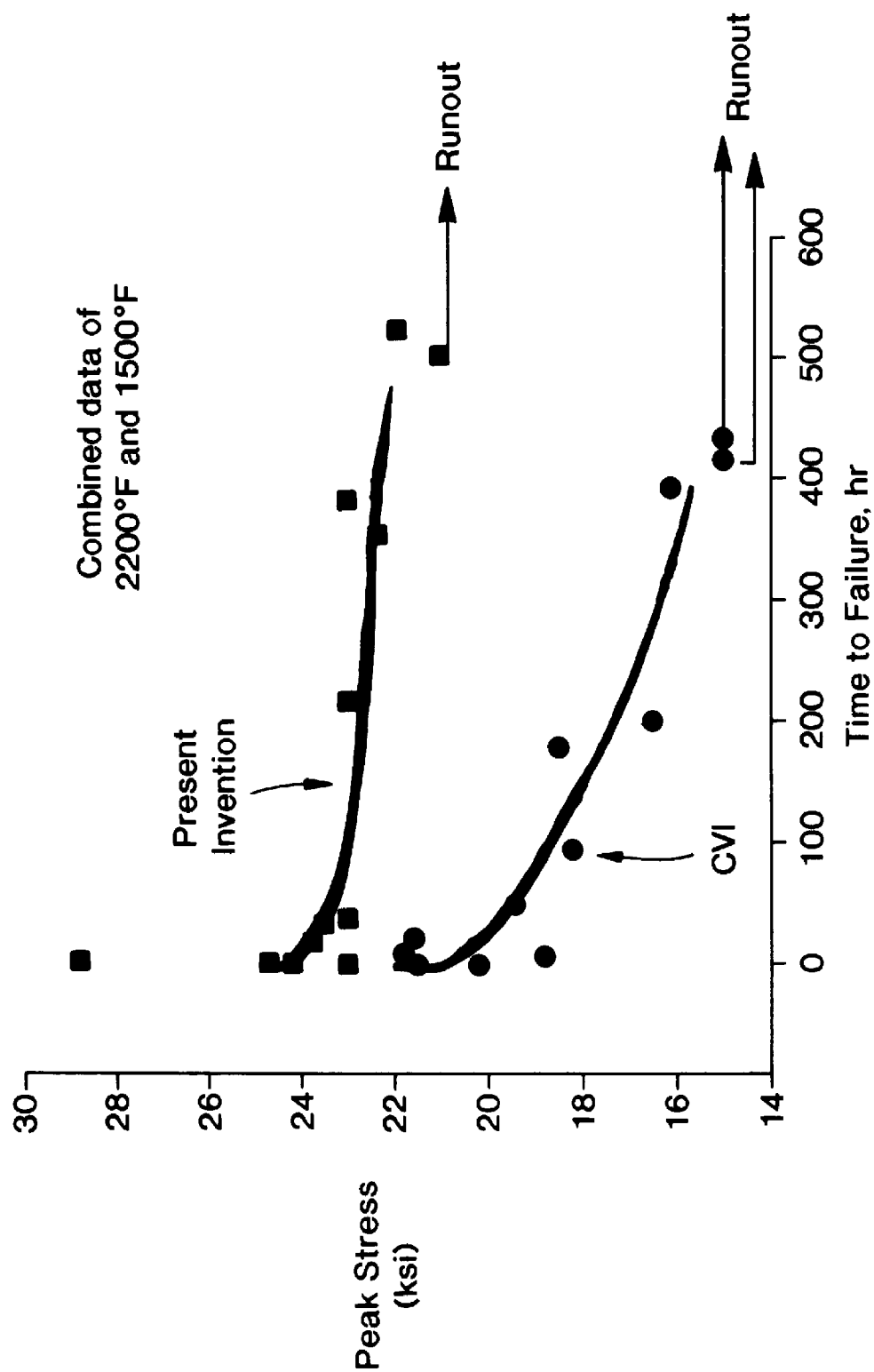
FIG. 5 is a graph comparing the cyclic fatigue peak stress of the CFCC of the present invention versus that of a state-of-the-art CFCC made by CVI process.
Figure 6:
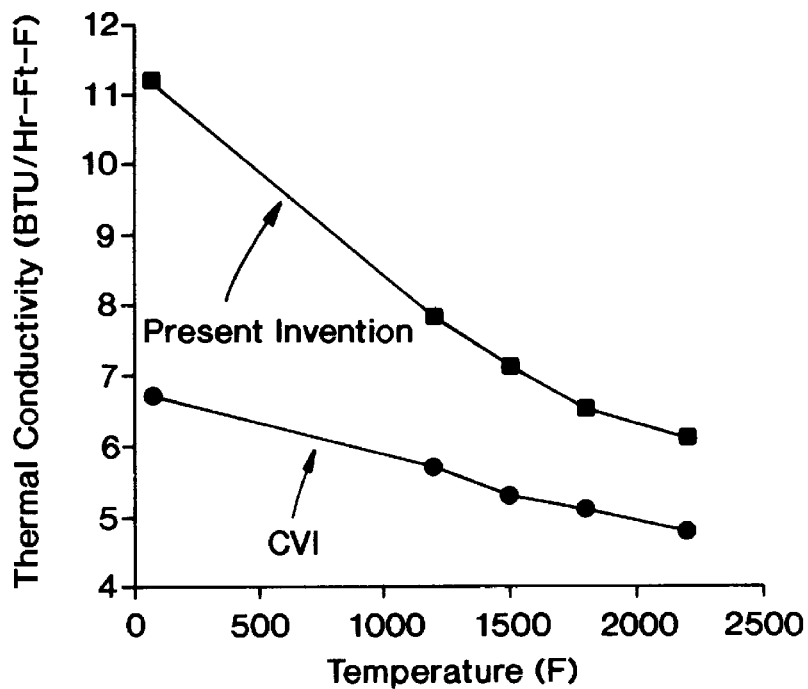
FIG. 6 is a graph comparing the thermal conductivity of the composite of the present invention and a composite densified by chemical vapor infiltration.

In the tenth embodiment, there is provided a silicon carbide fiber reinforced ceramic composite whose high strength SiC fiber is not degraded by the melt infiltration step (thereby producing high ultimate tensile strength and strain), and whose porosity is essentially filled by the melt infiltration step (thereby producing high cyclic fatigue and high thermal conductivity). In preferred embodiments, there is provided a silicon carbide fiber reinforced silicon carbide composite having an ultimate tensile strain of at least 0.3 % (preferably at least 0.6 %) at 2200° F. (using ASTM C1275-94); an ultimate tensile strength of at least 20 ksi (preferably at least 30 ksi) (using ASTM C1275-94); a thermal conductivity of at least about 5.5 BTU/hr ft°F. at 2200° F. and at least about 8 BTU/hr ft F at room temperature; and a cyclic fatigue peak stress of at least 20 ksi at 2200° F. See FIGS. 5 and 6. It also has a apparent porosity of less than 1 %. The composite also typically has less than 10 vol % in-situ formed beta silicon carbide, preferably less than 3 vol %.

Suitable fibers for use in the present invention include any non-oxide ceramic fiber having a degradation temperature of at least about 1400° C., preferably at least 1410° C. Some suitable fibers include non-oxide ceramic fibers such as carbon and silicon carbide fibers. In one embodiment, sintered silicon carbide fibers are used. In other embodiments, fibers comprising silicon carbide manufactured by Nippon Carbon Company, under the name of Hi-Nicalon ™, or SiC fibers manufactured by Dow Corning, under the name of Sylramic ™, are used. Some fibers which comprise silicon carbide, such as the Hi-Nicalon ™ material, have the characteristic of high strength (i.e., a strength of at least 200 MPa, and preferably at least 300 MPa) but degrade at relatively low temperatures (i.e., these fibers degrade when exposed to a molten silicon at temperatures of between 1410° C. and 1450° C., and in some cases between 1410° C. and 1420° C., for one hour). When such high strength, moderate temperature fibers are used, the above-described aspects of the present invention directed towards reducing the severity of the melt infiltration step are advantageously used.

If a coating is used upon the fibers, it is preferable to use a non-oxide ceramic coating, such as AlN, BN or $TiB_2$. If a BN coating is used, it preferably has a thickness of between about 0.1 to 3 μm, more preferably between about 0.3 to 2 μm, and is usually used as an inner debonding coating. If an AlN coating in used, it preferably has a thickness of between about 1–15 μm. If a silicon carbide coating is used, in particular as the outer protective layer of a duplex coating, then its preferred thickness is between 1 μm and 5 μm. This coating is also susceptible to molten silicon at high temperatures, so the processes of the present invention help this coating survive the infiltration step as well.

In one preferred process for making the invention, the slurry comprises about 1 wt % to 30 wt % coarse silicon carbide, about 25 wt % to 55 wt % fine silicon carbide, no binder, between 0.5 wt % and 5 wt % boron carbide, and between 21 wt % and 26 wt % deionized water. The slurry is milled for between 1 and 4 hours in order to insure its homogeneity. The pH of the slurry is adjusted to between 8 and 10 by adding ammonium hydroxide to the slurry. After milling, the slurry is diluted with 34–38 wt % deionized water to produce a slurry having a silicon carbide solids content of 57–58 wt %. A carbon source is added to the slurry so that from 0.1 wt % to 1 wt % added carbon is present in the slurry. Concurrently, an appropriate amount of sintered SiC fiber in the form of a woven preform is soaked in a solution of water containing about 2% or less of a non-ionic wetting agent, such as Triton X-100 surfactant. The preform is then immersed in an aqueous silicon carbide slurry and a vacuum is drawn in order to purge bubbles from the preform. The surfactant-treated fiber preform is then laid in the porous plaster mold. The slurry is then poured into the porous mold. Pressure (20–200 kPa) is then applied to the slurry to promote SiC particle impregnation of the preform and dewatering. The excess slurry is removed from the green part, and the resulting cast is then allowed to fully dry to form the green body. The green body is then completely densified by silicon melt infiltration. The temperature range for silicon infiltration is between 1400° C. and 1500° C. In some embodiments using temperature-sensitive fibers, the melt infiltration is carried out at between 1410° C. and 1450° C., more typically between 1400° C. and 1420° C. Under these conditions, the duration of the infiltration can be between about 15 minutes and 4 hours, preferably for between about 20 minutes and about 40 minutes. The process is preferably carried out under vacuum (in order to eliminate gas bubbles in the densified body), but can be carried out in inert gas under atmospheric pressure.

Typically, the composite comprises between about 20 vol % to 80 vol % coated fiber (more typically between about 40 vol % and 70 vol %); between about 1 vol % and 79 vol % infiltrated silicon carbide (more typically between about 15 vol % and 30 vol %), and between about 1 vol % and 79 vol % infiltrated alloy (more typically between about 15 vol % and 30 vol %). The densified matrix portion of the CFCC typically comprises less than 1 vol % apparent porosity.

If the silicon carbide feed material has significant contamination (for example, has at least 50 angstrom thick layer of silica), then the alloy infiltration step can be preceded by a silica reduction step, wherein the green body is subjected to temperatures of between about 1300° C. to 1350° C. for about a half hour in a reducing atmosphere. Since many melt infiltration furnaces have graphite heating elements, the reduction can be designed to occur in the same melt infiltration furnacing run just prior to actual infiltration of the alloy, and as part of the temperature ramp up cycle.

EXAMPLE I

This example examines the effect of adding small amounts of carbon to the molten silicon to produce a carbon saturated silicon alloy for the melt infiltration step.

About 94 gms of silicon powder (30–80 mesh in size) was mixed with about 1 gm of Raven 1255 carbon black and about 5 gm of SB 95 elemental boron. The mixture was loaded into a graphite crucible coated with a BN powder slurry (to keep the alloy from sticking to the graphite crucible). The crucible was then placed in a vacuum furnace and heated under vacuum to about 1450° C. for 1 hr to completely melt the Si—C—B mixture and form an alloy. After cooling down, the carbon saturated Si alloy was then crushed to a powder (–16 mesh in size) for use in the preparation of the melt infiltration "cover mix".

About 91.2 grams of the crushed carbon saturated alloy described above was mixed with 6.8 gm of Varcum 29353 liquid phenolic resin and 2 gm of Raven 1255 carbon black to prepare a melt infiltration cover mix. A SiC fiber perform (Hi-Nicalon™ fiber, 8 harness satin weave), coated with 0.5 μm BN and 4 μm SiC) was placed in a plaster mold and slurry cast with an aqueous SiC slurry into a green panel. Before the melt infiltration step, the green panel was first cut into two sections. One of the sections was placed on top of a silicon infiltration "cover mix" made from the carbon-saturated silicon, while the other was placed on top of a silicon infiltration cover mix made from silicon which was not pre-saturated with carbon. The two samples were loaded together into a vacuum furnace for melt infiltration. The melt infiltration conditions used were identical for both samples at 1450° C. for 60 minutes.

After melt infiltration, the samples were cut, cross-sectioned, mounted and metallographically polished for detailed characterization. Optical microscopic examination of the cross sections revealed drastically different results on the two samples. For the sample that was melt-infiltrated with regular silicon without carbon pre-saturation, extensive attack on the SiC, BN coating and the SiC fibers was encountered (the reaction zones thereof are depicted by light colored areas of fibers and broken down coatings in FIG. 1). With the debonding coating and fibers partially destroyed, severe degradation of thermo-mechanical properties would occur. In fact, the ultimate tensile strength and strain of this CFCC was found to be only 38.3 ksi and 0.38 %, respectively. On the other hand, for the sample that was melt-infiltrated with pre-alloyed silicon saturated with carbon, there was no reaction at all (see FIG. 2), and hence, excellent composite properties could be obtained. In fact, the ultimate tensile strength and strain of this CFCC of the present invention was found to be only 54.5 ksi and 0.62 %, respectively.

Figure 2:
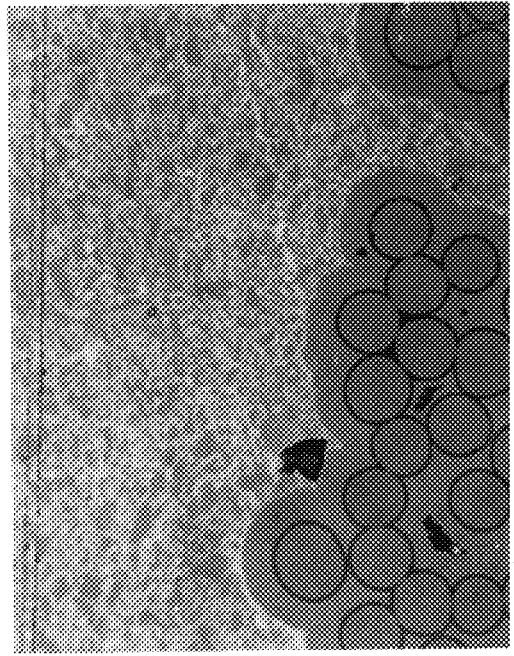
FIG. 2 is a photomicrograph at a 750× magnification of silicon carbide fiber reinforced silicon carbide composite of the present invention infiltrated with an alloy of silicon presaturated with carbon.
Figure 3:
FIG. 3 is a photomicrograph at a 50× magnification of silicon carbide fiber reinforced silicon carbide composite of the present invention, which shows essentially no porosity in the matrix regions over a relatively large region.
Figure 4:
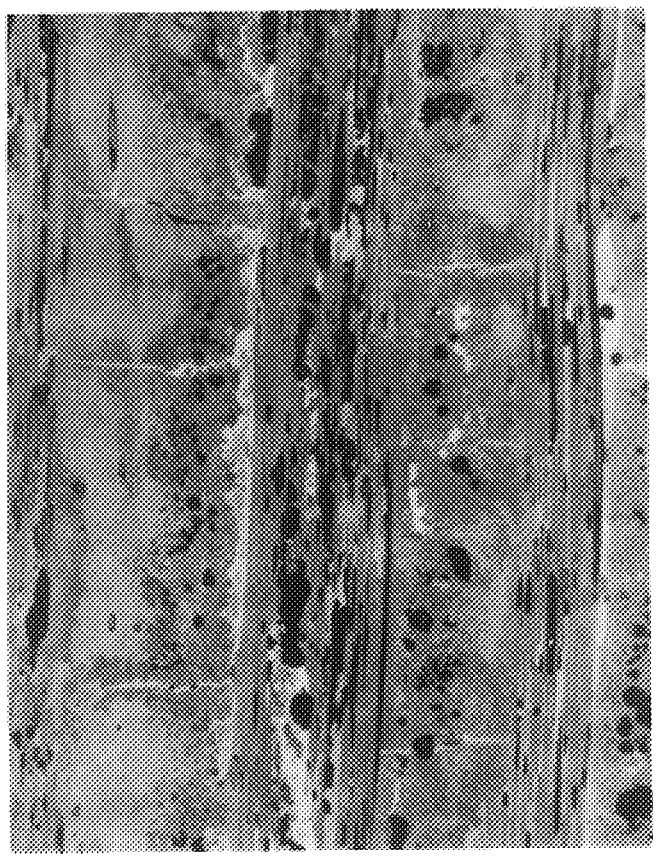
FIG. 4 is a photomicrograph at a 37.5× magnification of a composite in which silicon infiltration occurred after impregnation with a SiC slurry having a high concentration of added carbon.

FIG. 2 of this example may also be used to examine the effect of using lower-than-conventional amounts of carbon in the infiltration slurry. FIG. 3 presents a low magnification photomicrograph of the present invention which shows how the above-described process provides essentially complete infiltration of the green body and essentially zero apparent, or "open", porosity. FIG. 3 can be contrasted with FIG. 4 which contains a photomicrograph of a CFCC made by conventional processing using a slurry with at least about 10 wt % added carbon. In contrast to the complete densification shown in FIG. 3, the less complete processing of the FIG. 4 material results in higher porosity in the CFCC microstructure and a cracked matrix.

EXAMPLE II

This example discloses a method of preparing and using the cover mix of the present invention to infiltrate a complex shaped fiber preform.

A porous SiC fiber preform having a tubular shape (about 18 cm diameter and about 28 cm in height), one domed end and four tabs was prepared and impregnated with a silicon carbide slurry as previously described.

Concurrently, 94 wt % silicon granules (30–80 mesh commercial grade) with 5 wt % boron (SB 95) and 1 wt % carbon (Raven 1255) were hand blended with a spatula. This mixture was then placed in a BN-coated graphite box. The BN coating prevents reaction between the alloy and the graphite as well as sticking. The mixture was heated to 1450° C. for about 1 hour in vacuum so as to melt the silicon and form a silicon infiltrant alloy. After cooling, the solid infiltrant alloy was crushed into particles about −16 mesh in size.

A cover mix containing about 91.2 wt % of the −16 mesh silicon infiltrant alloy, about 2.0 wt % carbon (Raven 1255), and about 6.8 wt % phenolic resin (Varcum 29353) was prepared by hand blending.

Figure 7:
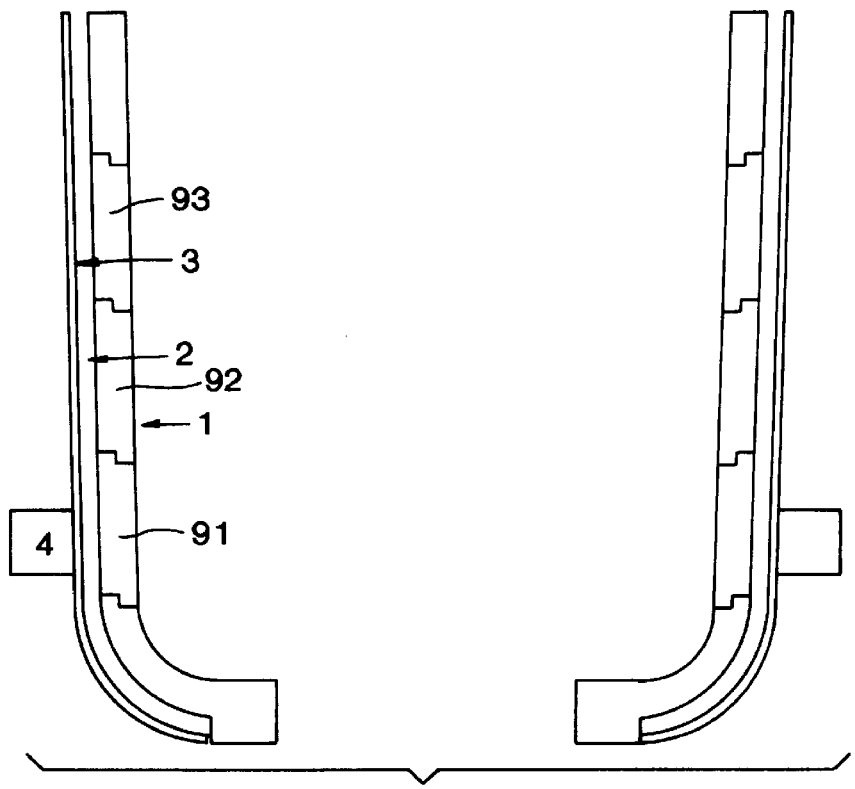
FIG. 7 is a drawing of a stackable fixture-fiber preform assembly preferably used to make the composite of the present invention.

In order to provide intimate contact between the preform and the cover mix and to insure the even application of the cover mix upon the preform, a segmented and stackable graphite internal fixture was constructed, as shown in FIG. 7. The fixture 1 is design to form a gap 2 between itself and the preform 3 so that the cover mix can be easily poured into the gap and tamped. For the present example, the gap was set at about 0.635 cm and the amount of the cover mix was selected to be about 1.4 times that theoretically required to precisely fill the green preform.

The fixture 1 comprises separate stackable rings 91, 92 and 93 which allow tamping of the cover mix at regular intervals. With only ring 91 set in place, the cover mix was poured into the gap formed between the fiber preform and ring 91 and tamped. Next, ring 92 was positioned above ring 91 and additional cover mix was poured and tamped. This procedure was repeated with each higher ring until the green preform inner diameter was completely contacted by cover mix. A mound of cover mix was also placed over the tabs 4 in contact with both the tab surfaces and the preform.

Figure 8:
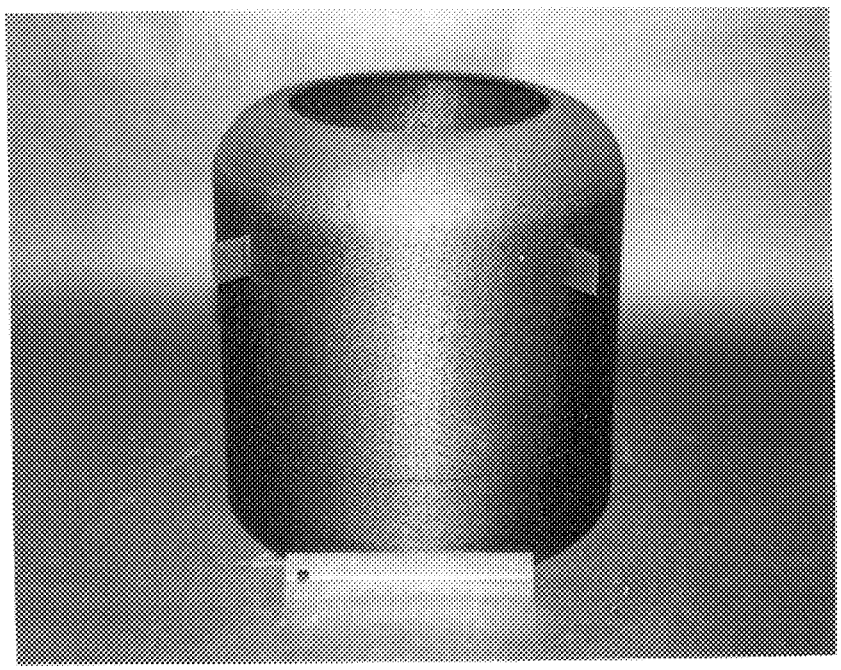
FIG. 8 is a photograph of a CFCC produced in accordance with the present invention.

The green preform/cover mix/fixture assembly was heated to about 120° C. to cure the resin component of the cover mix. Next, the fixture was removed one ring segment at a time. The green preform/cover blanket combination was then heated to a temperature of between about 1410° C. and about 1450° C. in vacuum to melt the alloy component of the cover mix and infiltrate the preform with the melted alloy. When melt infiltration was completed, the remnant of the cover blanket was found to be a porous SiC sponge which easily separated from the siliconized composite. FIG. 8 shows the infiltrated composite. Since the total amount of silicon provided was precisely controlled, there was very little excess silicon and as-processed surfaces appeared very clean.

EXAMPLE III

This Example examines the effect of overgrowing the infiltration layer on the surface of the fiber preform.

A flat rectangular fiber preform (6 inch×3 inch×0.008 inch) fabricated from a 5 HS Hi-Nicalon SiC fiber weave was slurry cast in a plaster mold. During the casting, care was taken to ensure that no build-up of any additional surface layer of monolithic SiC had occurred. After demolding and drying, the green composite panel was then melt infiltrated to form a dense composite. The surface texture of this panel (both back and front) was observed to have substantially duplicated the same roughness of the starting woven fabric. Quantitative surface measurement was conducted on the as-processed CFCC surface using a stylus profilometer. A high surface roughness value of $560\mu$ inch was obtained.

A second similar fiber preform was then fabricated. This time, however, the casting process was allowed to continue after the full impregnation of the preform interior. As a result, an exterior layer of monolithic SiC (at least about 0.010"in thickness) was deposited on one surface of the fiber panel. After demolding and drying, the "green" monolithic SiC surface was slightly polished with abrasive paper and a hand-held rubber-bonded diamond wheel to about 10 mil thickness. The "green" panel was melt infiltrated in the same manner as the first one. The "overcast" surface finish of this panel after melt infiltration was much smoother than the reverse surface. There was no resemblance to the original rough preform surface texture. Profilometer surface roughness measurement on this panel yielded a much smaller number of 85 $\mu$inch. It is clear that even better surface finish can readily be obtained with improved surface treatment (such as brushing) or green machining procedure.

It is apparent that the inventive methods and materials described above are a substantial advancement in the field of the manufacture of ceramic composites. The foregoing descriptions and examples are meant to be illustrative of the various inventive techniques and materials and are not intended to limit the scope of the invention, which includes all modifications and variations that fall within the scope of the following claims and their equivalent embodiments. For example, the ceramic fiber preform may include a carbon fiber preform on which the impregnation and infiltration steps are practiced.

We claim:

1. A process comprising the steps of:
   a) providing a fiber preform comprising a non-oxide ceramic fiber having at least one coating, comprising carbon,
   b) melting a matrix alloy comprising silicon and between 0.003 wt % and 10 wt % carbon dissolved therein to form a molten alloy, and
   c) infiltrating the fiber preform with the molten alloy.

2. The process of claim 1 wherein the fiber preform comprises fibers comprising silicon carbide, and the dissolved carbon is present in the alloy in an amount corresponding to at least 50 % of its saturation level in the alloy when the alloy is heated to 1410° C.

3. The process of claim 2 wherein the fiber comprising silicon carbide has a degradation temperature of between 1410° C. and 1450° C. and the molten alloy has a temperature of between 1410° C. and 1450° C.

4. The process of claim 3 wherein the fiber comprising silicon carbide is coated with at least one coating having a degradation temperature of between 1410° C. and 1450° C..

5. The process of claim 4 wherein the coating having a degradation temperature of between 1410° C. and 1450° C. is silicon carbide and the dissolved carbon is present in the alloy in an amount corresponding to at least 100% of its saturation level in the alloy when the alloy is heated to 1410° C.

6. The process of claim 1 wherein the fiber comprising silicon carbide is coated with an inner debonding coating of boron nitride and an outer protective coating of silicon carbide, and wherein the molten alloy further comprises at least 1 wt % dissolved nitrogen.

7. A process comprising the steps of:
   a) providing a fiber preform comprising fiber comprising silicon carbide,
   b) infiltrating the fiber preform with a slurry comprising between 0.1 wt % and 3 wt % added carbon, and
   c) impregnating the preform with a molten alloy comprising silicon at a temperature of between 1410° C. and 1450° C. wherein the added carbon and molten alloy react to provide an infiltrated body having less than 1% porosity and less than 3 vol % in-situ silicon carbide.

8. The process of claim 7 wherein the slurry comprises between 0.1–1 wt % added carbon.

9. The process of claim 7 wherein the slurry further comprises a bimodal blend of silicon carbide.

10. The process of claim 9 wherein the bimodal blend comprises a fine component having a particle size of between about 0.1 and 0.8 μm, and a coarse component having a particle size of between about 1 and 15 μm.

11. The process of claim 10 wherein the fine component comprises between 25 wt % and 55 wt % of the slurry, and the coarse component comprises between 1 wt % and 30 wt % of the slurry.

12. The process of claim 7 wherein the slurry further comprises between 0.5 wt % and 5 wt % boron carbide.

13. The process of claim 7 wherein the slurry comprises no binder component.

14. A process for uniformly infiltrating with an infiltrant a porous body comprising fiber comprising silicon carbide, the fiber having a degradation temperature of no more than 1450° C. and a surface, comprising the steps of:
   a) providing a cover mix comprising an infiltrant material and a resin, the mix having a form adapted to intimately contact at least a portion of the porous body,
   b) placing the cover mix on at least a major portion of the portion of the surface of the porous body to be infiltrated,
   c) heating the cover mix to a temperature sufficient to melt the infiltrant material and infiltrate the pores of the porous body with the molten infiltrant.

15. The process of claim 14 wherein the cover mix is heated to no more than about 1450° C.

16. The process of claim 15 further comprising the step of curing the resin of the cover mix prior to step b).

17. The process of claim 15 wherein the infiltrant material comprises silicon.

18. The process of claim 17 wherein the surface of the porous body has a contour and the cover mix is shaped to correspond to the contour of the surface of the porous body.

19. The process of claim 17 wherein the cover mix is placed on the face of the porous body in a way such that the longest distance between any portion of the porous body and the cover mix is no more than 1 cm.

20. The process of claim 14 wherein the face of the porous body has curved contour, the resin of the cover mix is cured, and a portion of the cover mix has a shape substantially similar to the contour of the face of the porous body.

21. A process comprising the steps of:
   a) providing a fiber preform comprising:
      i) between 20 vol % and 80 vol % coated fiber, the fiber comprising silicon carbide, and
      ii) between 20 vol % and 80 vol % porosity,
   b) impregnating a slurry comprising ceramic particles into the porosity of the fiber preform to form a green body having a porosity which is lower than the porosity of the fiber preform and an exterior surface, and
   c) depositing ceramic particles on the exterior surface of the green body to form a monolithic layer of ceramic particles on the exterior surface of the green body, and
   d) green machining the monolithic layer to a surface roughness Ra of no more than 200 μinches.

22. The process of claim 21 wherein the monolithic layer comprises silicon carbide particulate and has a porosity of between 30 vol % and 60 vol %.

23. The process of claim 21 further comprising the step of:
   e) infiltrating the green body with a matrix alloy comprising molten silicon.

24. The process of claim 21 further comprising the steps of:
   e) infiltrating the green body with a matrix alloy comprising molten silicon, and
   f) finishing the melt-infiltrated composite to a surface roughness Ra of no more than 50 μinches.

25. A process comprising the sequential steps of:
   a) providing a fiber preform comprising silicon carbide,
   b) impregnating the preform with a slurry comprising a bimodal blend of silicon carbide particles, wherein the bimodal blend comprises a fine component having a particle size of between about 0.1 and 0.8 μm and a coarse component having a particle size of between about 1 and 15 μm,
   c) infiltrating the preform with a matrix alloy comprising silicon.

26. The process of claim 25 wherein the fine component comprises between 25 wt % and 55 wt % of the slurry, and the coarse component comprises between 1 wt % and 30 wt % of the slurry.

27. The process of claim 25 wherein the slurry further comprises between 0.5 wt % and 5 wt % boron carbide.

28. The process of claim 25 wherein the slurry comprises no binder component.

29. A process comprising the steps of:
   a) providing a green body comprising:
      i) between 20 vol % and 80 vol % coated fiber, the fiber comprising silicon carbide, and
      ii) between 20 vol % and 80 vol % porosity,
   b) soaking the preform in a solution consisting essentially of water and a surfactant,
   c) providing a porous mold,
   d) placing the soaked fiber preform in the mold,
   e) contacting the fiber preform with a slurry comprising water and ceramic particles to infiltrate the porosity of the fiber preform with the ceramic particles of the slurry, and
   f) pressure casting the slurry to form a green body having a porosity which is lower than that of the fiber preform.

30. A pressure casting process for producing an impregnated fiber preform, comprising the steps of:
   a) providing a fiber preform comprising:
      i) between 20 vol % and 80 vol % coated fiber, the fiber comprising silicon carbide,
      ii) between 20 vol % and 80 vol % porosity,
   b) providing a porous mold,
   c) placing the fiber preform in the mold,
   d) contacting the fiber preform with a slurry comprising water and ceramic particles to infiltrate the porosity of the fiber preform with the ceramic particles of the slurry, and
   e) pressure casting the slurry to form a green body having a porosity which is lower than that of the fiber preform.

31. The process of claim 30 wherein the ceramic particles comprise silicon carbide.

32. The process of claim 30 wherein the pressure casting is performed at a pressure of between 20 kPa and 200 kPa.

33. A process comprising the steps of:
   a) providing a fiber preform comprising a non-oxide ceramic fiber having at least one coating, the coating comprising silicon carbide, the fiber having a degradation temperature of between 1410° C. and 1450° C.

b) impregnating the preform with a slurry comprising silicon carbide particles and between 0.1 wt % and 3 wt % added carbon to produce an impregnated green body, c) providing a cover mix comprising:
   i) an alloy comprising silicon and between 0.003 wt % and 10 wt % carbon dissolved therein, and
   ii) a resin, d) placing the cover mix on at least a portion of the surface of the porous silicon carbide body, e) heating the cover mix to a temperature between 1410° C. and 1450° C. to melt the alloy, and f) infiltrating the fiber preform with the melted alloy for a time period of between 15 minutes and 240 minutes, to produce a ceramic fiber reinforced ceramic composite having less than 3 vol % in-situ formed silicon carbide and less than 1% porosity.

34. The process of claim 33 wherein the non-oxide ceramic fiber is a fiber comprising silicon carbide.

35. The process of claim 33 wherein the non-oxide ceramic fiber is carbon.

36. The process of claim 34 wherein the fiber comprising silicon carbide has an inner debonding coating of boron nitride coated thereon, and an outer protective coating of silicon carbide.

* * * * *